Dec. 29, 1970    N. W. DONNER    3,550,307

FRESH BAIT HOLDER

Filed June 13, 1969    2 Sheets-Sheet 1

Inventor
Norman W. Donner
By John J. Kowalik
Attorney

Dec. 29, 1970    N. W. DONNER    3,550,307
FRESH BAIT HOLDER
Filed June 13, 1969    2 Sheets-Sheet 2
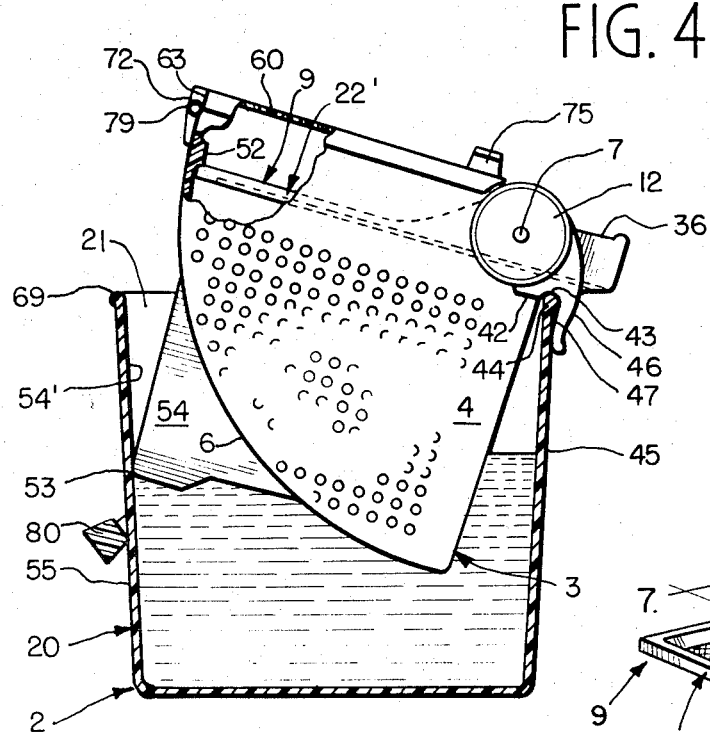
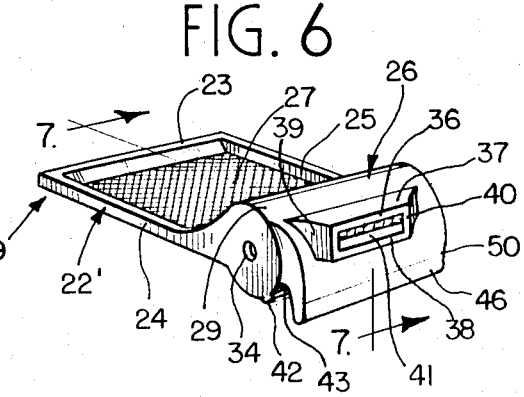
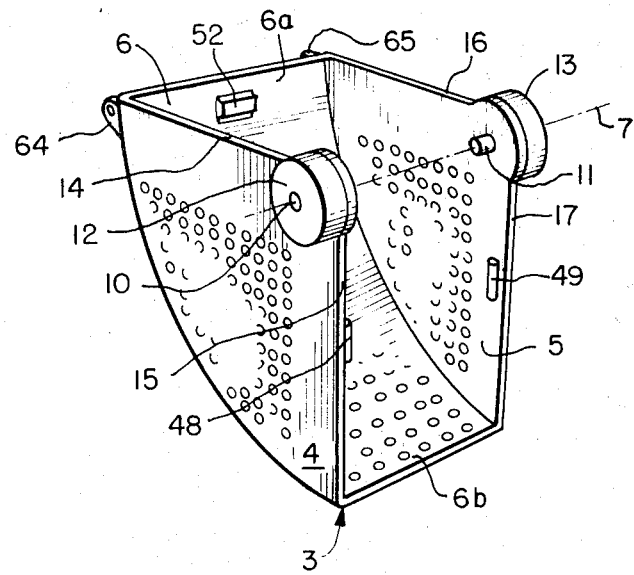
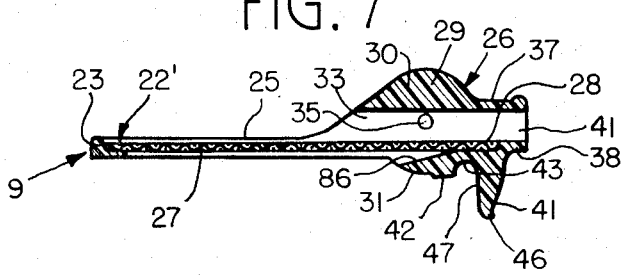
Inventor
Norman W. Donner
By John J. Kowalik
Attorney

United States Patent Office 3,550,307
Patented Dec. 29, 1970

3,550,307
FRESH BAIT HOLDER
Norman William Donner, 5409 S. Laflin St.,
Chicago, Ill. 60609
Filed June 13, 1969, Ser. No. 832,937
Int. Cl. A01k 97/04
U.S. Cl. 43—56          10 Claims

ABSTRACT OF THE DISCLOSURE

A fresh bait holder having an outer container for water and an inner container for bait, a metering bait scoop pivoted on the inner container and having an upright position with a screen at its lower end and a metering spout at its upper end, the scoop being swingable to a position withdrawing the screen with the bait from the water and having a cam surface beneath the spout which fulcrums on the upper edge of the outer container and upon the user with only one hand depressing the spout raising the screen and inner container and thereby inclining the screen toward the spout which causes the bait to migrate through the spout.

---

This invention is an improvement over my structure shown and claimed in my companion U.S. Pat. application Ser. No. 783,648, filed Dec. 13, 1968 and now Pat. No. 3,413,584.

DISCUSSION OF THE PRIOR ART

In prior art structures expensive assembly problems have been encountered and the requirement that the fisherman use both hands in operating the bait bucket made it inconvenient to use necessitating that he drop the fishing pole or other tackle into the boat and use one hand to swing the handle of the bait scoop and the other to receive the bait.

SUMMARY OF THE INVENTION

A general object of the invention is to provide a novel, simple, and efficient bait holding device in which the parts are arranged so that they may be actuated by the one hand into which the bait is metered.

A further object is to provide a live bait holding device which comprise inner and outer containers nested in a compact arrangement and wherein the inner container has a screen swingable to a position netting the bait therein and effective to raise the inner container which serves as a bias to reestablish the parts in a storing position after the bait is metered to the user.

The invention comprehends an arrangement wherein a cover is provided for the inner container with means biasing it to closed position through engagement with the outer container and telescoping of the inner container within the outer one.

Figure 1:
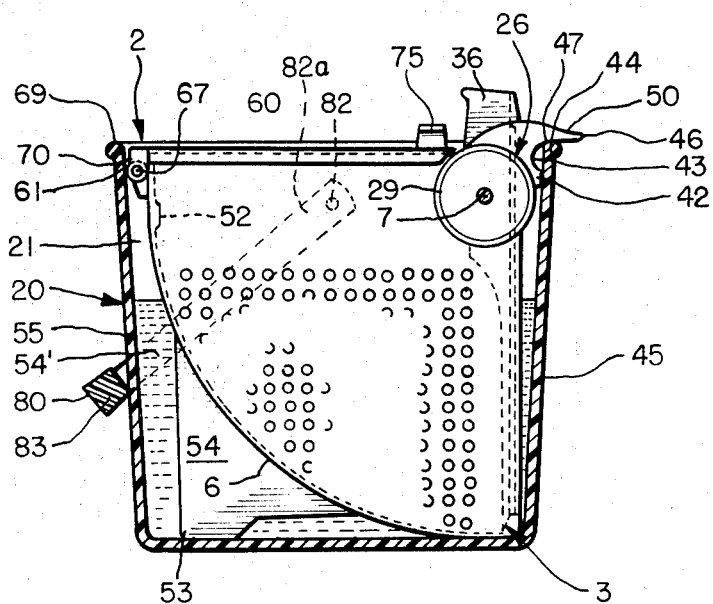
Figure 2:
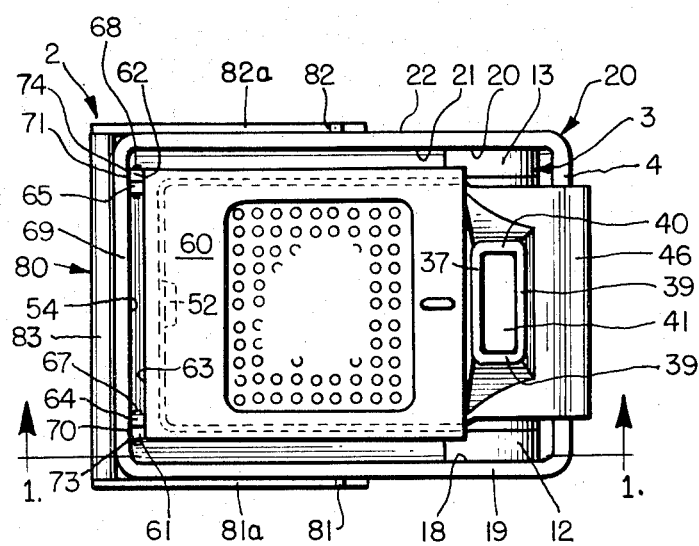
Figure 3:
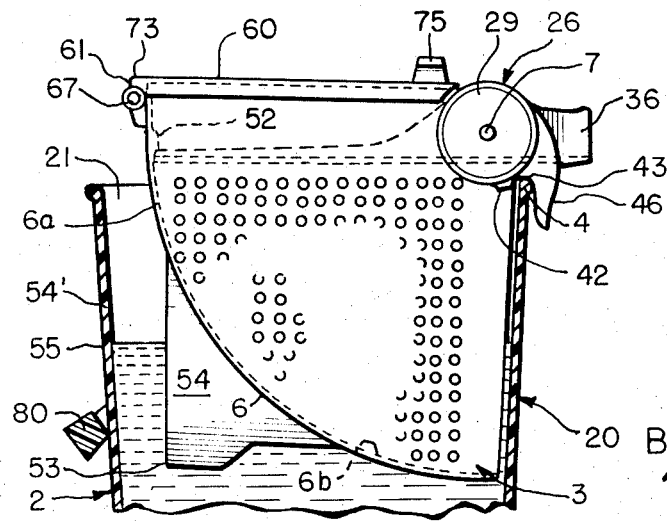

These and other objects and advantages inherent in and encompassed by the invention will become more apparent from the specification and the drawings, wherein:

FIG. 1 is a transverse vertical sectional view taken substantially on line 1—1 of FIG. 2;
FIG. 2 is a plan view;
FIG. 3 is a view similar to FIG. 1 showing the inner container and bait scoop in elevated position;
FIG. 4 is a further view similar to FIG. 3 in which the parts are in metering position;
FIG. 5 is a front perspective view of the inner container with the bait scoop removed;
The number of parts used heretofore also required an extensive layout of capital for inventory and handling.
FIG. 6 is a perspective view of the scoop assembly, and
FIG. 7 is a transverse vertical view taken substantially on line 7—7 of FIG. 6.

Describing the invention in detail and having reference to the drawings, there is shown a bait holder generally designated 2 which comprises an inner container 3 having a pair of perforated, flexible, vertical, laterally spaced side walls 4 and 5 and an inter-connecting curved rear-bottom wall 6 having rear and bottom portions 6a, 6b. Wall section 6a, 6b are struck from the pivot center or axis 7 upon which a combined scoop and metering spout structure 9 is pivoted.

The pivot pins 10 and 11 are secured in the bosses 12 and 13 which are formed at the juncture of the edges 14, 15 of wall 4 and 16, 17 of wall 5 and project outwardly therefrom and serve as spacers.

The spacer 12 abuts the interior 18 of side wall 19 of the outer container 20 and spacer 13 abuts the interior 21 of side wall 22 of the outer container 20 thus centering container 3 within container 20.

The bait scoop 9 is of rectangular form and has a peripheral frame 22' comprising a transverse rear element 23 side elements 24, 25 and a front spout 26. A screen 27 is fitted in the frame and fits at its forward edge portion 28 into the spout 26 which comprises a cylindrical rear portion 29 having top and bottom sections 30, 31 which are vertically spaced and provide a bait passage 33 and at their ends connect to the bosses 12 and 13 which provide coaxial pivot apertures 34, 35 into which fit the pins 10 and 11.

The spout passage 33 into which the forward end portion of the screen 27 extends into the spout extension or nozzle 36 which has top and bottom walls 37, 38 and forwardly converging side walls 39, 40 terminating in an open end 41.

The spout has a transverse bar 42 formed in the bottom of sector 31 at its forward side beneath the inner end portion of the spout extension 36 which forms one side of a cam notch 43 which admits a rounded upper edge portion 44 of the front wall 45 of the outer container 20. The forward side of the cylindrical portion 29 is provided with a lever 46 which projects outwardly from the bottom side of the spout extension and projects beyond the front wall 45 and affords a cam surface 47 on its bottom side which engages the top edge 44 of the front wall in the position shown in FIG. 1 in which the screen 27 is vertically disposed adjacent to the wall 45 and the frame 22' of the screen engages the inwardly projecting stops 48, 49.

The inner container is normally in the position shown in FIG. 1, and to dispense bait the user presses with the back edge of his hand downwardly against the top side 50 of the lever 46 with the palm covering the opening 41. The inner container is cammed up initially over the edge portion 44 to a position shown in FIG. 3 while the rear transverse element 23 engages a stop 52 which projects forwardly from the upper portion 6a of the rear section of wall 6.

The user further presses down on the spout and the entire inner container tilts upwardly with the screen as seen in FIG. 4 until the rear edge corner 53 of a support leg 54 on the bottom section 6a engages the inner side 54' of the rear wall 55 of the outer container. In this position the bait migrates downwardly and outwardly into the palm of the user.

The user, after obtaining the bait he needs, releases the spout extension and the weight of the inner container causes it to swing downwardly to a position shown in FIG. 1 while the screen is cammed downwardly on the surface 47 and assumes the position of FIG. 1 and the spout 26 extends upwardly.

The inner container has a cover 60 which comprises a pair of laterally spaced depending hinge elements 61, 62 on the rear edge 63 of the rectangular cover. The hinge elements 61, 62 flank a pair of hinge elements 64, 65 projecting rearwardly from portion 6 adjacent to side walls 4 and 5. Coaxial pins 67, 68 pivotally interconnect elements 61, 64 and 62, 65. A feature of the present invention is in the arrangement of the cover 60 below the upper edge 69 of the wall of the outer container and in providing cam rear edges 70, 71 on the hinge elements 61, 62 and cam lobes 73, 74 which are adapted to engage the inner surface 54 of the rear wall 55 of the outer container such that upon the inner container being tilted slightly as seen in FIG. 3 to raise the elements 61, 62 above the edge 69, the cover may be swung open in a counterclockwise direction by grasping the handle 75 and pulling upwardly when the inner container descends into the outer container, the edges 70, 71 ride on the upper edge 69 and this causes the cover to swing in a clockwise direction to closed position. The parts are so dimensioned that the cover may be opened from the position of FIG. 1 by pulling upwardly on the handle 75 which causes the lobes 73, 74 to engage the inner side 54 and further lifting of the handle elevates these lobes above the edge 69 whereupon surfaces 70, 71 ride on edge 69 of the rear wall 59 while the inner container pivots about the front edge 44 on the lever surface 47.

A bail 80 is provided having a pair of legs flanking the walls 19 and 22 and pivoted thereto on coaxial pins as at 81 and 82, the bail having its bight portion 83 bearing against the back side 85 of wall 55.

It will be seen that a drain surface 86 is provided on the top of the bottom sector 31 which is disposed beneath the forward end portion 28 of the screen and in the bait discharging position of this device, such surface slopes downwardly and rearwardly to drain any water carried by the bait back into the containers.

Thus a novel, simple, and efficient bait holder has been provided which is simple to operate with one hand by the user.

What is claimed is:

1. A fresh bait holder comprising telescoped inner and outer containers, the outer container adapted to receive water therein and the inner container being perforated and adapted to receive bait therein, an assembly for scooping the bait from the water comprising a screen at one end and a spout at the other end, means pivotally mounting said assembly in the inner container in a normally generally vertical position, cooperative cam means on the assembly and the upper edge portion of said outer container, said assembly swingable from said vertical position by an operator depressing said spout for engaging the cam means thereon with the cam means on the upper edge portion of said outer container, said spout movable downwardly to cam said assembly upwardly, and means on the inner container abutting said screen and adapted to elevate the inner container about said cam means whereat said screen is disposed in a downwardly inclined position toward the spout to cause the bait on the screen to migrate through the spout, said inner container serving to bias said assembly about said cam means to its initial position upon release thereof by the user with attendant descent of said inner container into the outer container.

2. The invention according to claim 1 and a lever on the spout projecting forwardly of the outer container in the vertical position of said assembly and providing an initial cam surface for camming said inner container upwardly.

3. The invention according to claim 1 and said inner container being formed of flexible material and including a pair of side walls biased toward each other and manually spreadable apart, and said assembly forming one wall of the inner container and receivable between said pair of side walls and interfitting pin and socket means on said assembly and said side walls providing said pivotal mounting means.

4. The invention according to claim 1 and a cover for the inner container, means hinging the cover to the inner container and presenting means engageable with the outer container upon said cover being moved to open position for biasing the cover to closed position.

5. The invention according to claim 4 and said biasing means comprising cam surfaces on the hinging means adapted to ride over the upper edge of the outer container and camming the inner container upwardly whereby upon release of the cover the inner container is free to descend and thereby drop the cam surfaces below the upper edge of the outer container causing the cover to close.

6. The invention according to claim 1 and said spout comprising a bottom wall portion and an operating lever extending angularly from said bottom portion over said upper edge portion and forming a palm-receiving pocket therewith of the hand of the user when positioned over the spout.

7. The invention according to claim 1 and said inner container having a curved wall forming a bottom portion and a rear portion thereof, said outer container having a bottom and upright wall portions, and a combination rest and stop projecting outwardly from said curved wall and in the rest position of the holder seating upon the bottom of the outer container and in the elevated position limiting tilting of the inner container about said upper edge portion through abutment with a wall portion of the outer container in an area opposite the region of camming thereof on the upper edge.

8. The invention according to claim 7 and stop means on the interior of the rear portion of the curved wall adjacent to its upper end for limiting upward swinging movement of said assembly.

9. The invention according to claim 8 and said assembly having a generally cylindrical section intermediate the screen and the spout, and a cover on the inner container having sealing engagement with said section.

10. The invention according to claim 9 and said inner container having a pair of flexible side walls biased toward said assembly disposed therebetween, and means on the confronting sides of said side walls for limiting swinging movement of said assembly out of said inner container.

References Cited

UNITED STATES PATENTS

| | | | |
|---|---|---|---|
| 2,082,754 | 6/1937 | Peterson | 43—56 |
| 2,884,736 | 5/1959 | Harrell | 43—56 |
| 3,105,320 | 10/1963 | Milanos et al. | 43—56 |
| 3,380,186 | 4/1968 | Donner | 43—56 |

WARNER H. CAMP, Primary Examiner